(12) United States Patent
Jung et al.

(10) Patent No.: US 6,308,208 B1
(45) Date of Patent: Oct. 23, 2001

(54) METHOD FOR MONITORING NETWORK DISTRIBUTED COMPUTING RESOURCES USING DISTRIBUTED CELLULAR AGENTS

(75) Inventors: Carey L. Jung; Michael McNally, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/164,019

(22) Filed: Sep. 30, 1998

(51) Int. Cl.[7] .................................................. G06F 15/173
(52) U.S. Cl. ........................... 709/224; 709/201; 709/202; 709/205
(58) Field of Search .................................. 709/201, 202, 709/205, 223, 224, 204; 345/330; 370/254; 710/17, 18; 714/39, 47, 51

(56) References Cited

U.S. PATENT DOCUMENTS

| | | | |
|---|---|---|---|
| 4,536,791 | | 8/1985 | Campbell et al. .................... 358/122 |
| 4,862,268 | | 8/1989 | Campbell et al. .................... 358/141 |
| 5,561,803 | * | 10/1996 | Rilis ........................................ 717/7 |
| 5,589,892 | | 12/1996 | Knee et al. ........................... 348/731 |
| 5,617,565 | | 4/1997 | Augenbraun et al. ................ 395/604 |
| 5,655,081 | * | 8/1997 | Bonnell et al. ....................... 709/202 |
| 5,751,963 | * | 5/1998 | Umetsu ................................. 709/223 |
| 5,991,179 | * | 12/1999 | Kekic et al. .......................... 345/349 |
| 5,996,010 | * | 11/1999 | Leong et al. ......................... 709/223 |
| 6,049,819 | * | 4/2000 | Buckle et al. ........................ 709/202 |
| 6,088,727 | * | 7/2000 | Hosokawa et al. ................... 709/223 |
| 6,101,538 | * | 8/2000 | Brown .................................. 709/223 |
| 6,141,699 | * | 10/2000 | Luzzi et al. .......................... 709/331 |

* cited by examiner

Primary Examiner—Mehmet B. Geckil
(74) Attorney, Agent, or Firm—Jeffrey S. Labaw; Duke W. Yee; Michael R. Nichols (57) ABSTRACT

A method of automated distributed resource monitoring in a large distributed computing environment, wherein a given master resource comprises a set of given computing resources. The method begins by associating a set of one or more "cells" with a set of given computing resources that comprise the master resource. Each cell preferably is associated with a respective one of the set of given computing resources and has a set of one or more attributes whose values collectively define a "state" of the cell. Whenever a change in an attribute of a given cell effects a change in that cell's state, the attribute change is propagated across each cell directly impacted by the cell state change, as well as to those observing cells that may be indirectly affected.

20 Claims, 5 Drawing Sheets

METHOD FOR MONITORING NETWORK DISTRIBUTED COMPUTING RESOURCES USING DISTRIBUTED CELLULAR AGENTS

BACKGROUND OF THE INVENTION

1. Technical Field

The present invention is directed to managing a large distributed computer enterprise environment and, more particularly, to implementing a monitoring task across distributed computing resources in the environment.

2. Description of the Related Art

Enterprises now desire to place all of their computing resources on a computer network. To this end, it is known to connect computers in a large, geographically-dispersed network environment and to manage such an environment in a distributed manner. One such management framework consists of a server that manages a number of nodes, each of which has a local object database that stores object data specific to the local node. Each managed node typically includes a management framework, comprising a number of management routines, that is capable of a relatively large number (e.g., hundreds) of simultaneous network connections to remote machines. The framework manages hundreds of megabytes of local storage and can spawn many dozens of simultaneous processes to handle method requests from local or remote users. This amount of power, however, is quite costly. Each managed node requires upwards of a megabyte of local memory of disk plus a permanent TCP/IP connection. If a managed node sees heavy use, then such costs go up considerably. Moreover, as the number of managed nodes increases, the system maintenance problems also increase, as do the odds of a machine failure or other fault.

The problem is exacerbated in a typical enterprise as the node number rises. Of these nodes, only a small percentage are file servers, name servers, database servers, or anything but end-of-wire or "endpoint" machines. The majority of the network machines are simple personal computers ("PC's") or workstations that see little management activity during a normal day. Nevertheless, the management routines on these machines are constantly poised, ready to handle dozens of simultaneous method invocations from dozens of widespread locations, invocations that rarely occur.

When networks get very large, individual machines tend to lose their identity. Nevertheless, machines of certain classes share certain problems. To manage such distributed systems, it has been proposed to "abstract" a given "resource" in the distributed network into a so-called "model" to facilitate administration. Examples of distributed system resources include computer and communications hardware, operating system software, application programs, systems of programs cooperating to provide a service, and the like. Managing resource models (as opposed to specific resources) provides significant advantages. Thus, for example, by enabling an administrator to characterize the type or class of machine that should receive a particular task, resource model-based management obviates naming a vast host of machines explicitly or the distribution of tasks to all machines within a domain.

Although resource model-based management is desirable, existing schemes generally function by modeling resources at an individual node level. In many distributed environments, a given resource has an operating state that may be dependent on many other computing elements that are distributed across nodes throughout the enterprise. It would thus be desirable to provide a resource model-based management scheme that operates across distributed nodes. The present invention addresses this need in the art.

BRIEF SUMMARY OF THE INVENTION

It is a primary object of the present invention to monitor resources in a computer environment using a distributed set of monitoring "cells", preferably implemented via provisioned software agents. A set of monitoring cells comprise a distributed monitor sometimes referred to herein as a "cellular automaton." A given cell is preferably designed to reflect the actual properties of the real resource "modeled" by the cell. Depending on the complexity of the resource, a given cell may "observe" other cells or it may be observed by another cell. The observer-observed relationship in the distributed cellular automaton thus preferably corresponds to the relationships between resources at different levels of conceptual complexity. As a concrete example, a cell representing a database server resource is an observer of cells representing disk drives, operating systems, and application processes. Thus, the database server may be construed as a "master" resource comprising a set of computing resources (e.g., disk drives, operating system and application processes) whose individual states may impact the state of the master resource.

Thus, in accordance with one aspect of the present invention, a given master resource having a set of computing resources is monitored in a distributed manner. The method begins by associating a set of one or more monitoring "cells" with a set of given computing resources that comprise the master resource. Each cell is associated with a respective one of the set of given computing resources and has a set of one or more attributes whose values collectively define a state of the cell. A given cell attribute value is preferably a function of zero or more simple constants, a primitive operation, other attributes of the cell (intra-cell attributes), or attributes of one or more other cells (inter-cell attributes). When a given cell attribute value is a function of other cell attributes, that value should be dynamically updated as a result of changes in the intra-cell and/or inter-cell attributes on which it depends. Thus, according to the invention, upon change of a given attribute of a given cell that effects a change in cell state, the method propagates the attribute change across each cell directly impacted by the cell state change. Thereafter, resulting cell state changes are then propagated across any other affected cells. Thus, the inventive method propagates changes in the attributes of any cell to all observers of that cell.

In accordance with the invention, a monitoring cell is preferably a software agent for implementing a resource monitoring task in conjunction with other software agents. In a preferred implementation, the software agent is a set of instructions that is executed in a separate runtime engine that is dispatched and provisioned at the particular node on which the resource is located. Instances of the runtime engine are deployed where each monitoring cell is implemented to create a distributed runtime environment in the distributed computer network.

Thus, in accordance with another feature of the present invention, a method of resource monitoring in a distributed computer network begins by deploying instances of a runtime engine across a subset of the machines to create a distributed runtime environment in the network. Then, a set of one or more monitoring agents are associated with the subset of the machines. Each monitoring agent is a cell of a distributed cellular monitor or "automaton". Each cell is associated with a respective one of a set of given computing resources and has a set of one or more attributes whose values collectively define a state of the agent or cell. The automaton includes a control means, effective upon change of a given attribute of a given cell that effects a change in cell state, for propagating the attribute change across each cell directly or indirectly impacted by the cell state change.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
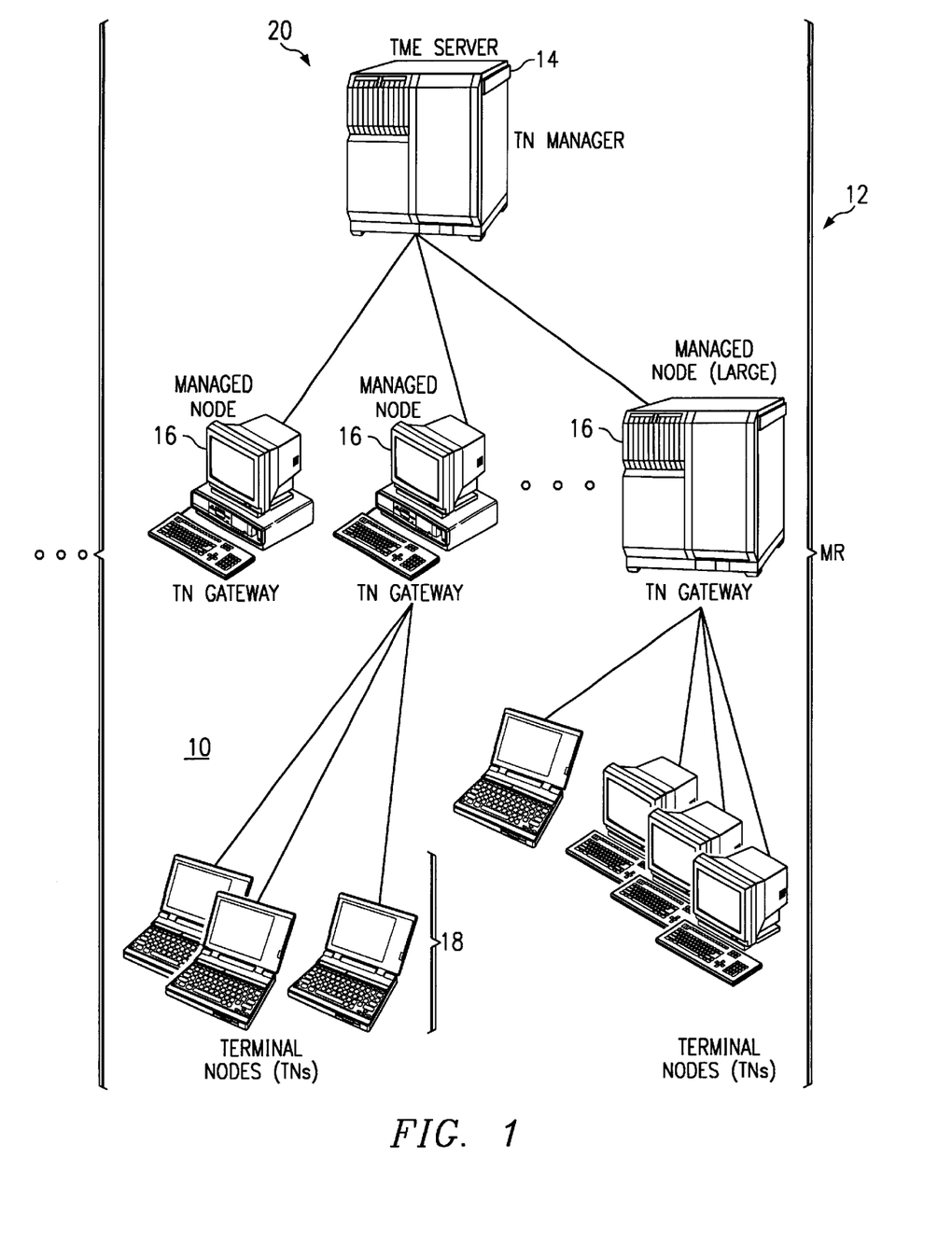
FIG. 1 illustrates a simplified diagram showing a large distributed computing enterprise environment in which the present invention is implemented.

Referring now to FIG. 1, the invention is preferably implemented in a large distributed computer environment 10 comprising up to thousands of "nodes." The nodes will typically be geographically dispersed and the overall environment is "managed" in a distributed manner. Preferably, the managed environment (ME) is logically broken down into a series of loosely-connected managed regions (MR) 12, each with its own management server 14 for managing local resources with the MR. The network typically will include other servers (not shown) for carrying out other distributed network functions. These include name servers, security servers, file servers, threads servers, time servers and the like. Multiple servers 14 coordinate activities across the enterprise and permit remote site management and operation. Each server 14 serves a number of gateway machines 16, each of which in turn support a plurality of endpoints 18. The server 14 coordinates all activity within the MR using a terminal node manager 20.

Figure 2:
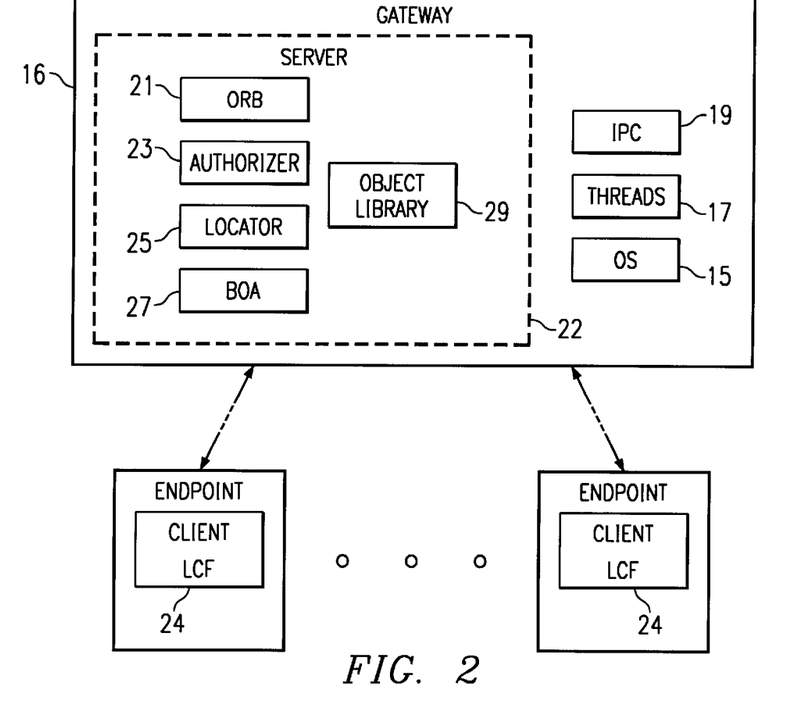
FIG. 2 is a block diagram of a preferred system management framework illustrating how the framework functionality is distributed across the gateway and its endpoints within a managed region.

Referring now to FIG. 2, each gateway machine 16 runs a server component 22 of a system management framework. The server component 22 is a multi-threaded runtime process that comprises several components: an object request broker or "ORB" 21, an authorization service 23, object location service 25 and basic object adaptor or "BOA" 27. Server component 22 also includes an object library 29. Preferably, the ORB 21 runs continuously, separate from the operating system, and it communicates with both server and client processes through separate stubs and skeletons via an interprocess communication (IPC) facility 19. In particular, a secure remote procedure call (RPC) is used to invoke operations on remote objects. Gateway machine 16 also includes an operating system 15 and a threads mechanism 17.

The system management framework includes a client component 24 supported on each of the endpoint machines 18. The client component 24 is a low cost, low maintenance application suite that is preferably "dataless" in the sense that system management data is not cached or stored there in a persistent manner. Implementation of the management framework in this "client-server" manner has significant advantages over the prior art, and it facilitates the connectivity of personal computers into the managed environment. Using an object-oriented approach, the system management framework facilitates execution of system management tasks required to manage the resources in the MR. Such tasks are quite varied and include, without limitation, file and data distribution, network usage monitoring, user management, printer or other resource configuration management, and the like.

Figures 2A, 3:
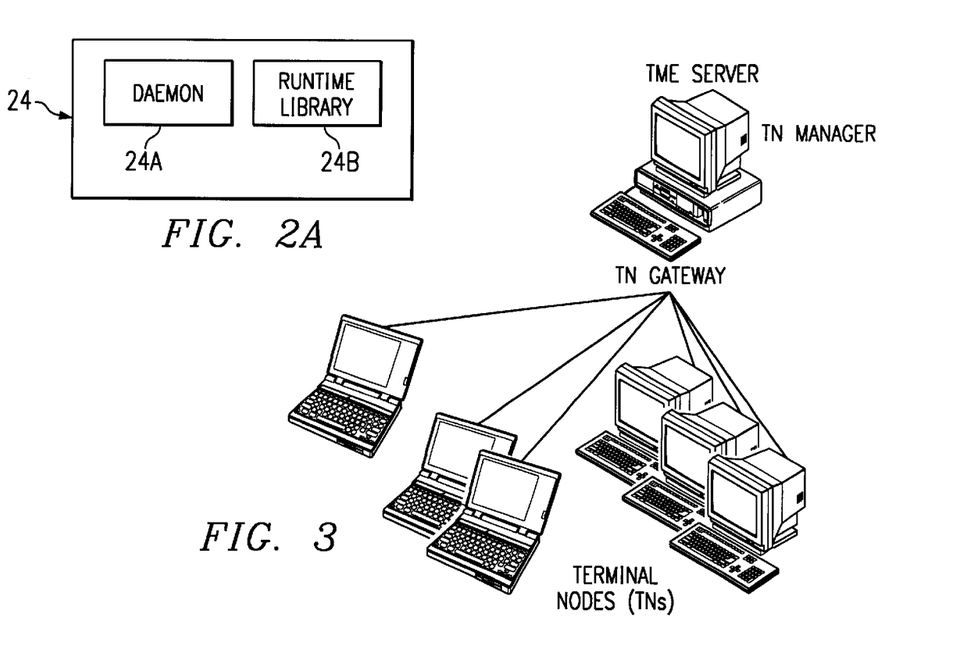
FIG. 2A is a block diagram of the elements that comprise the LCF client component of the system management framework.
FIG. 3 illustrates a smaller "workgroup" implementation of the enterprise in which the server and gateway functions are supported on the same machine.

In the large enterprise such as illustrated in FIG. 1, preferably there is one server per MR with some number of gateways. For a workgroup-size installation (e.g., a local area network) such as illustrated in FIG. 3, a single server-class machine may be used as the server and gateway, and the client machines would run a low maintenance framework References herein to a distinct server and one or more gateway(s) should thus not be taken by way of limitation as these elements may be combined into a single platform. For intermediate size installations the MR grows breadth-wise, with additional gateways then being used to balance the load of the endpoints.

The server is the top-level authority over all gateway and endpoints. The server maintains an endpoint list, which keeps track of every endpoint in a managed region. This list preferably contains all information necessary to uniquely identify and manage endpoints including, without limitation, such information as name, location, and machine type. The server also maintains the mapping between endpoint and gateway, and this mapping is preferably dynamic.

As noted above, there are one or more gateways per managed region. Preferably, a gateway is a fully-managed node that has been configured to operate as a gateway. Initially, a gateway "knows" nothing about endpoints. As endpoints login, the gateway builds an endpoint list for its endpoints. The gateway's duties preferably include: listening for endpoint login requests, listening for endpoint update requests, and (its main task) acting as a gateway for method invocations on endpoints.

As also discussed above, the endpoint is a machine running the system management framework client component, which is referred to herein as the low cost framework (LCF). The LCF has two main parts as illustrated in FIG. 2A: the LCF daemon 24a and an application runtime library 24b. The LCF daemon 24a is responsible for endpoint login and for spawning application endpoint executables. Once an executable is spawned, the LCF daemon 24a has no further interaction with it. Each executable is linked with the application runtime library 24b, which handles all further communication with the gateway.

Preferably, the server and each of the gateways is a computer or "machine." For example, each computer may be a RISC System/6000® (a reduced instruction set or so-called RISC-based workstation) running the AIX (Advanced Interactive Executive) operating system, preferably Version 3.2.5 or greater. Suitable alternative machines include: an IBM-compatible PC x86 or higher running Novell UnixWare 2.0, an AT&T 3000 series running AT&T UNIX SVR4 MP-RAS Release 2.02 or greater, Data General AViiON series running DG/UX version 5.4R3.00 or greater, an HP9000/700 and 800 series running HP/UX 9.00 through HP/UX 9.05. Motorola 88K series running SVR4 version R40V4.2, a Sun SPARC series running Solaris 2.3 or 2.4, or a Sun SPARC series running SunOS 4.1.2 or 4.1.3. Of course, other machines and/or operating systems may be used as well for the gateway and server machines.

Each endpoint is also a computer. In one preferred embodiment of the invention, most of the endpoints are personal computers (e.g., desktop machines or laptops). In this architecture, the endpoints need not be high powered or complex machines or workstations. One or more of the endpoints may be a notebook computer, e.g., the IBM ThinkPad® machine, or some other Intel x86 or Pentium®-based computer running Windows '95 or greater operating system. IBM® or IBM-compatible machines running under the OS/2® operating system may also be implemented as the endpoints. An endpoint computer preferably includes a browser, such as Netscape Navigator or Microsoft Internet Explorer, and may be connected to a gateway via the Internet, an intranet or some other computer network.

Preferably, the client-class framework running on each endpoint is a low-maintenance, low-cost framework that is ready to do management tasks but consumes few machine resources (because it is normally in an idle state). Each endpoint may be "dataless" in the sense that system management data is not stored therein before or after a particular system management task is implemented or carried out.

Figure 4:
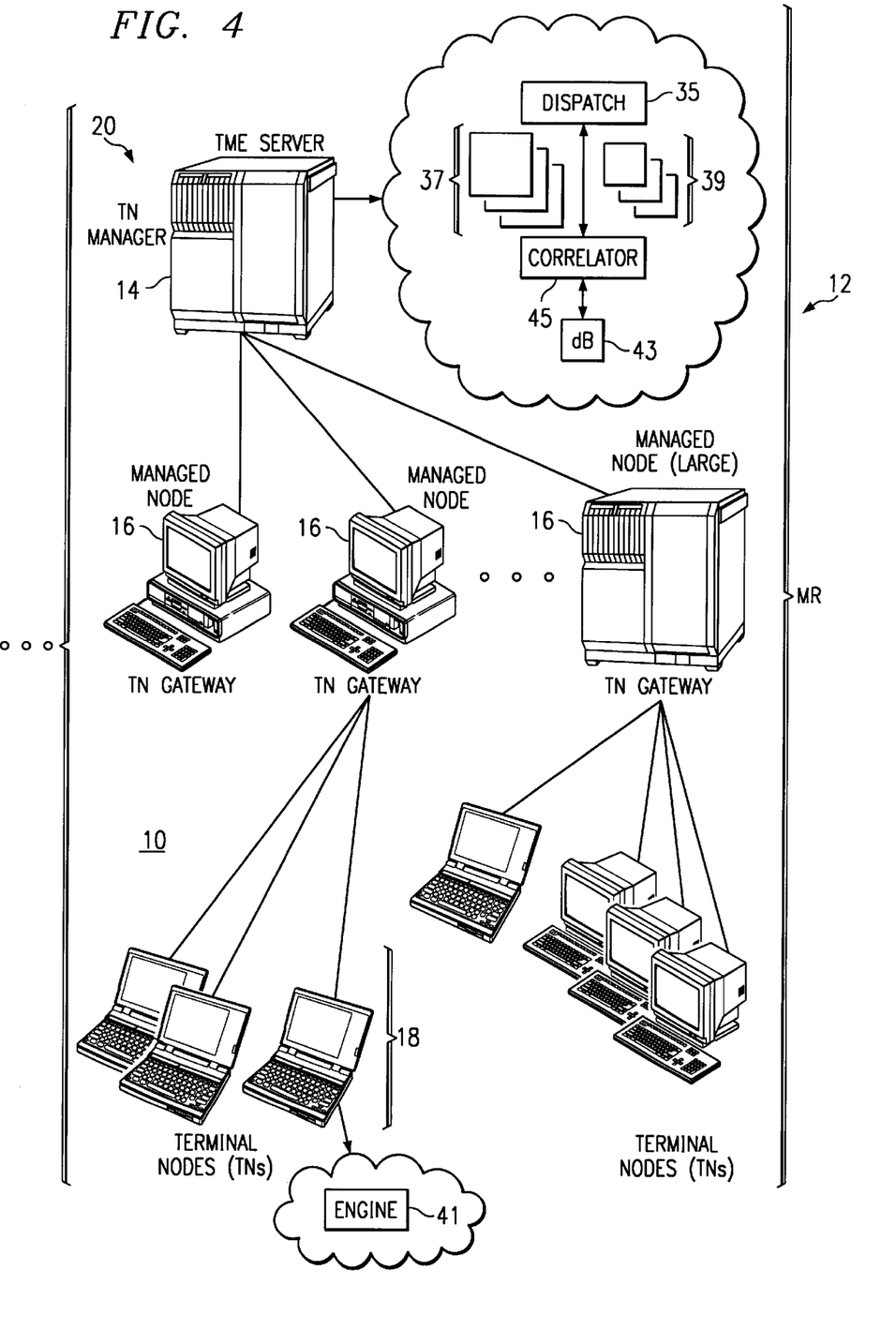
FIG. 4 is a distributed computer network environment having a management infrastructure for use in carrying out the preferred method of the present invention.

As distributed systems such as described above grow in size and complexity, management becomes more difficult. To facilitate system management, it is known in the art to provide certain of the managed machines with a uniform "engine" that executes one or more tasks (e.g., software "agents") that have been and/or distributed by a central mechanism. This architecture is illustrated in FIG. 4.

In this embodiment, a set of "software agents" 37 are available at a central location (e.g., manager 14) or at a plurality of locations (e.g., the gateways 16) in the network where administrative, configuration or other management tasks are specified, configured and/or deployed. The software agents are "mobile" in the sense that the agents are dispatched from a dispatch mechanism 35 and then migrate throughout the network environment. Generally, as will be seen, the mobile software agents traverse the network to perform or to facilitate various network and system management tasks. A mobile software agent may be used for resource monitoring, as will be described below. Dispatch mechanism 35 may include a set of configurable software tasks 39 from which one or more agents are constructed. Manager 14 preferably also includes a database 43 including information identifying a list of all machines in the distributed computing environment that are designed to be managed.

At least some of the gateway nodes 16 and at least some of the terminal nodes 18 (or some defined subset thereof) include a runtime environment 41 that has been downloaded to the particular node via a distribution service. The runtime environment 41 includes a runtime engine (as well as other components) for a software monitoring agent as will be described. Software agents are deployable within the network to perform or to facilitate a particular monitoring or other task (e.g., administration, configuration or other management task) specified by an administrator or other system entity. Preferably, the software agent is a piece of code executed by the runtime engine located at a receiving node. Alternatively, the software agent runs as a standalone application using local resources.

In a representative embodiment, both the runtime engine and the software agent(s) are conveniently written in Java. As is known in the art, Java is an object-oriented, multi-threaded, portable, platform-independent, secure programming environment used to develop, test and maintain software programs. These programs include full-featured interactive, standalone applications, as well as smaller programs, known as applets, that run in a Java-enabled Web browser.

In one particular embodiment of the present invention, a software agent is a Java applet (e.g., comprised of a set of Java "class" files) and the runtime environment includes a Java Virtual Machine (JVM) associated with a Web browser. In this illustrative example, various nodes of the network are part of the Internet, an intranet, or some other computer network or portion thereof. When the administrator configures a task for deployment, the dispatch mechanism compiles the appropriate Java class files (preferably based on the task or some characteristic thereof) and dispatches the applet (as the software agent) in the network. An applet is then executed on the JVM located at a receiving node.

In a large network of computing machinery as illustrated above, a variety of things at different levels of conceptual complexity may be considered "resources". Thus, for example, some resources are actual hardware components of the network or the computing machinery, such as network routers or disk drives. Some resources are simply properties of the operating systems running on computers in the network, for example, a set of active applications or open files. Still other resources may be applications running on computers in the network. Finally, for management purposes, an aggregation of these types of resources may be considered a single high-level or "master" resource. Examples of such high-level resources are database management systems that include one or more server processes, client processes and their connections to a given server, file systems (such as disk drives), operating system resources, distributed computation systems that include server applications on various computers, interconnections, file and memory resources, and communication subsystems.

Figure 5:
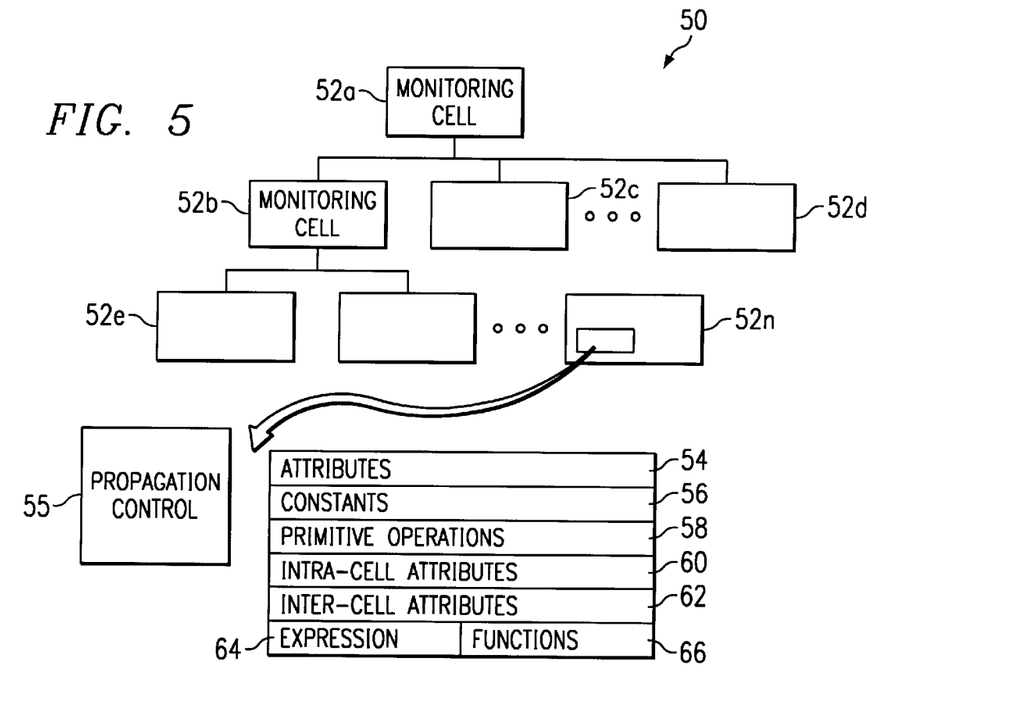
FIG. 5 is a simplified block diagram of a cellular automation or distributed monitor according to the teachings of the present invention.

Distributed computing resources, in order to be used as critical components for the operation of an enterprise, must be continually monitored. According to the present invention, such monitoring is carried out in a distributed fashion by a machine sometimes referred to herein as an "cellular automaton." With reference now to FIG. 5, a "cellular automaton" as used herein is a computing mechanism 50 comprising a set of "cells" 52a–52n, where each cell 52 is uniquely identifiable among all other cells and is observable by zero or more other cells. Collectively, a set of cells, in the aggregate, are used to model a particular master resource and thus to effect a distributed monitoring task. In accordance with the invention, each cell preferably has one or more attributes 54, which are simple named items of information. As illustrated in FIG. 5, the particular value of a cell attribute is a function of zero or more simple constants 56, primitive operations 58, other attributes of the cell 60, or attributes of one or more observed cells 62. The particular "definition" of a cell attribute is an expression 64 involving those sources of information combined by algebraic operators and various algebraic, statistical, logical, or transformational functions 66. At any given point in time, the values of all attributes of a given cell are collectively referred to at the "state" of the cell.

Figure 6:
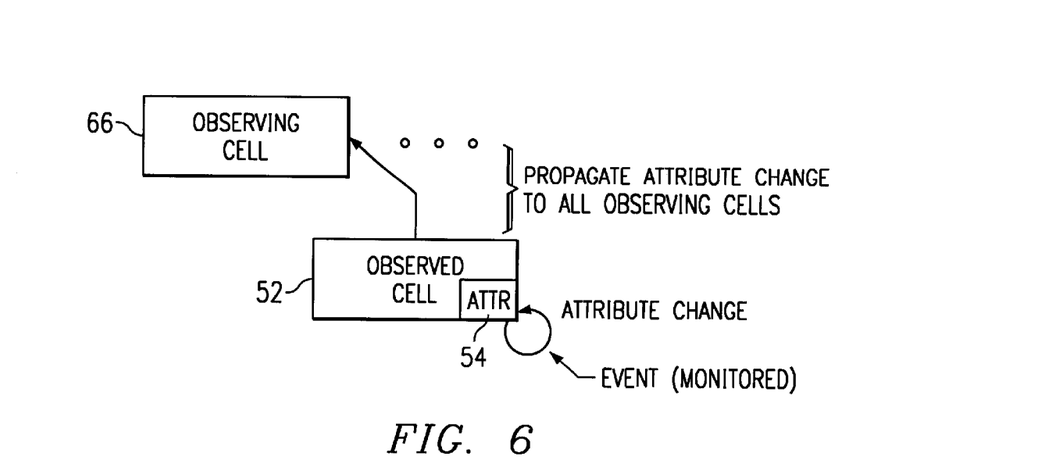
FIG. 6 is a simplified diagram of the state change propagation method of the present invention.
Figure 7:
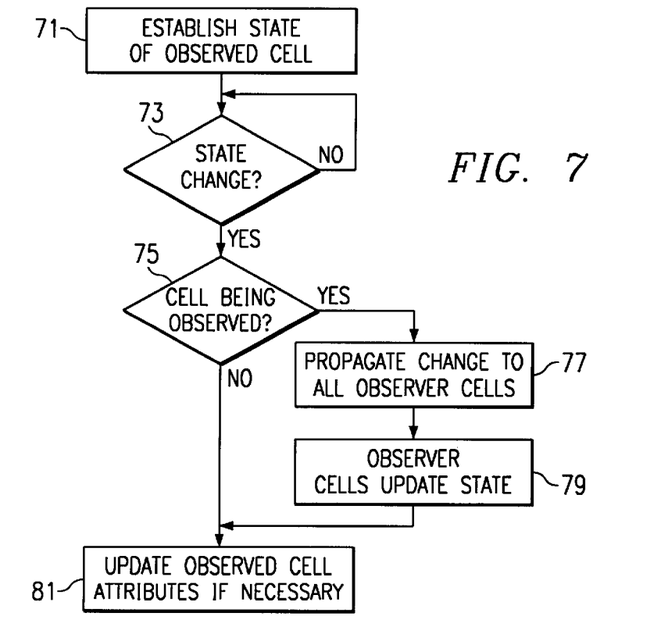
FIG. 7 is a simplified flowchart of the state change propagation method shown in FIG. 6.

The cell "state" thus may be expected to vary dynamically as the cell effects its monitoring function. The particular actions or events that may trigger a state change are defined by the particular cell attributes and the transform functions 66 that together define the cell state. According to the present invention, state changes within a given cell may trigger state changes in other cells as the distributed monitoring is carried out. Thus, the cellular automaton 50 includes a control mechanism 55 for propagating changes in the attributes of any cell to all observers of that cell. This process is illustrated in FIG. 6 and described in the simplified flowchart of FIG. 7.

The inventive routine begins at step 71 (in FIG. 7) by establishing a state of the observed cell 52. As noted above, the particular state of the observed cell 52 depends on the one or more cell attributes 54. At step 73, a test is performed to determine whether the state of the observed cell 52 has changed as a result of a change of a given attribute. If the outcome of the test at step 73 is negative, the routine cycles. If, however, the outcome of the test at step 73 is positive, a change of state has occurred. Thus, for example, the observed cell has monitored some event and that event has modified, updated or otherwise changed the given attribute. A test is then performed at step 75 to determine whether the cell 52 is being observed by any other cell 66 ("observer" cells). If the outcome of the test at step 75 is positive, the routine branches to step 77 to propagate the change in the given attribute to all observer cells 66. At step 79, the observer cells update their state accordingly. If the outcome of the test at step 75 is negative, or after step 79, the new attribute value of the given attribute is used to update the values of any attributes of the observed cell whose definitions are affected by the attribute. This is step 81. Thus, as illustrated in FIG. 6, a change to a cell attribute 54a may result in a change to the state of the cell 52 and, if so, that change is propagated to all observer cells 66. In turn, the new attribute value 54a of the observed cell 52 is used to update the values of any attributes 54b–n whose definitions involve the changed attribute. Although not shown in detail, it should be appreciated that a state change to a given observer cell may impact state changes in cells observing that cell.

The above-described state change propagation method continues throughout the automaton. Thus, as observer cells have their state changed, other cells that are observing the observer cells are likewise impacted. In particular, the above-described state change propagation method is carried out with respect to all cells, whether directly-connected and indirectly-affected by a given state change. The observer-observed relationships in the distributed monitor thus preferably correspond to the relationships between resources at different levels of conceptual complexity, and state changes at particular levels are propagated throughout the monitor as necessary to update cell states. Resulting state changes are in turn propagated through the automaton by the control mechanism 55 as previously described. The control mechanism is preferably implemented in each software agent. In this manner, the techniques of cell identification and state change propagation support communication across a network between separate computing machines that together comprise a given resource being monitored.

The present invention thus provides automated distributed monitoring in a large distributed computing environment. Generalizing, and with reference now to FIG. 8, a higher level cell 70 corresponding to a master resource has associated therewith one or more lower level cells 72. In a concrete example, higher level cell is a database management system that includes one or more server resources 74, client processes and their connections to the server 76, file systems 78 (e.g., disk drives) and operating system resources 80 comprising the lower level cells. A given lower level cell, for example, is assigned some low level monitoring task depending on the nature of the computing resource defined by that cell. Thus, a lower level cell associated with a file system would be assigned to monitor free disk space. An operating system resource, for example, would be assigned to monitor a number of CPU cycles consumed per unit time, etc. As monitor values change across the lower level cells, such changes get propagated automatically (e.g., as events) to the higher level cell, which includes its own monitor. This architecture advantageously creates a hierarchical buildup of derived data wherein values in the monitoring cell are dependent on values below in the hierarchy. A particular distributed monitoring agent (e.g., an agent in the lower level of the hierarchy) does not necessarily know what other cells it is affecting. Thus, monitoring agents are hooked up across nodes and look at network events in a much more global and dynamic fashion.

The primitive operations involved in determining cell attribute values are desirably operations that gather information directly from the real resources represented by cells. Thus, continuing with the above example, a cell representing a disk drive will involve primitive operations that acquire such measurements as input/output rate, unused file space, and errors accumulated.

Figure 8:
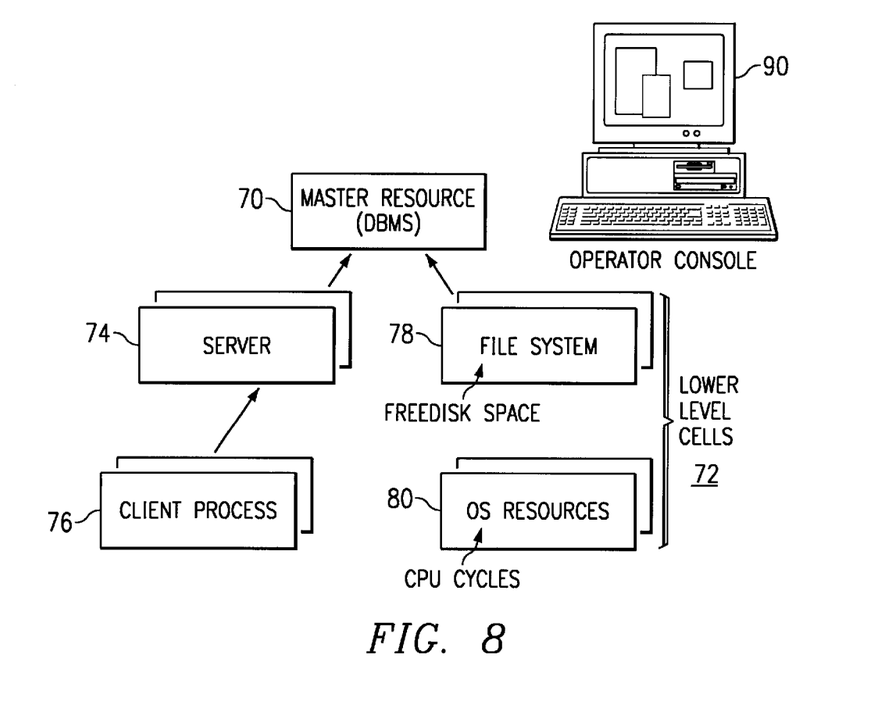
FIG. 8 is a block diagram of a hierarchy of monitoring cells that model a master resource and its associated computing element resources in accordance with the preferred embodiment of the present invention.

As illustrated in FIG. 8, the distributed cellular automaton 50 can be monitored by an operator console 90 by exploiting the mechanism of cell observation. An operator console preferably is made to appear to the automaton as a cell observing ordinary cells involved in monitoring resources. As noted above, changes to those cells are then propagated to operator consoles, which preferably use visual user interface techniques to provide an operator with a dynamic view of the state of selected resources in the network. The operator console mechanism allows operators to explicitly select resources to monitor (i.e. cells to observe). The console mechanism also supports an automated policy-driven mechanism to include in the operator view any resources (i.e. any cells) that fit some predetermined criteria. Thus, an operator may use a navigation or selection tool to explicitly request that changes to the state of particular cells be reflected in the view. The operator may also establish criteria describing certain types of resources (for example, disk drive resources) such that any cells added to the system at any time will automatically be observed by the operator console.

A given monitoring cell is preferably implemented by a software agent deployed within the distributed computing enterprise as previously described. In this manner, the software agent that provides the monitoring cell functionality may be executed in a runtime engine that has been deployed at given nodes of the network where the components of the master resource being monitored reside.

One of the preferred implementations of the inventive software monitoring agent is as a set of instructions in a code module resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or even downloaded via the Internet.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific network environment, those skilled in the art will recognize that the invention can be practiced, with modification, in other and different network architectures with the spirit and scope of the appended claims.

Having thus described our invention, what we claim as new and desire to secure by letters patent is set forth in the following claims:

What is claimed is:

1. A method of resource monitoring in a large distributed computing environment, wherein a given master resource comprises a set of given computing resources, comprising the steps of:
   (a) associating a set of cells with a set of given computing resources that comprise the master resource, each cell associated with a respective one of the set of given computing resources and having a set of one or more attributes whose values collectively define a state of the cell;
   (b) upon change of a given attribute of a given cell that effects a change in cell state, propagating the attribute change across each cell directly impacted by the cell state change; and
   (c) propagating resulting cell state changes across any affected cells.

2. The method as described in claim 1 wherein each cell uniquely identifies the given computing resource.

3. The method as described in claim 1 wherein a given cell attribute value that is a function of a constant.

4. The method as described in claim 1 wherein a given cell attribute value is a function of a primitive operation.

5. The method as described in claim 1 wherein a given cell attribute value is a function of other cell attributes.

6. The method as described in claim 1 wherein a given cell attribute value is a function of attributes of one or more other cells.

7. The method as described in claim 1 wherein a cell is a software agent deployed to the given computing resource.

8. The method as described in claim 7 wherein the software agent is executed in a runtime engine.

9. A method of resource monitoring in a distributed computer network having a management server servicing a set of machines, comprising the steps of:
   deploying instances of a runtime engine across a subset of the machines to create a distributed runtime environment in the distributed computer network;
   associating a set of one or more agents with the subset of the machines, each agent associated with a respective one of the set of given computing resources and having a set of one or more attributes whose values collectively define a state of the agent; and
   upon change of a given attribute of a given agent that effects a change in agent state, propagating the attribute change across each agent directly or indirectly impacted by the agent state change.

10. The method as described in claim 9 wherein a given agent attribute value is a function of a constant.

11. The method as described in claim 9 wherein a given agent attribute value is a function of a primitive operation.

12. The method as described in claim 9 wherein a given agent attribute value is a function of other attributes of that agent.

13. The method as described in claim 9 wherein a given agent attribute value is a function of attributes of one or more other agents.

14. A method of automated distributed monitoring in a large distributed computing environment, comprising the steps of:
   (a) associating a given computing resource in the distributed computing environment with a monitoring cell, wherein each monitoring cell has a set of one or more attributes whose values collectively define a state of that cell;
   (b) organizing the set of monitoring cells into a hierarchy having at least a first level and a second level, wherein at least one cell in the first level has attributes that depend on attributes in one or more cells in the second level; and
   (c) upon a change of state of a given cell in the second level, automatically propagating new attribute values to at least one cell in the first level.

15. The method as described in claim 14 further including updating the state of the cell in the first level to reflect the new attribute values propagated from the cell in the second level.

16. A system for use in a distributed computer network having a management server servicing a set of managed computers, comprising:
   a plurality of software agents for implementing a resource monitoring task, each software agent deployed at a given computing resource and having a set of one or more attributes whose values collectively define a state of that software agent;
   a plurality of instances of a runtime environment installed at given managed computers, wherein the runtime environment includes a runtime engine for executing a software agent to effect the resource monitoring task; and
   means associated with a given software agent and responsive to a change of state of that software agent for automatically propagating new attribute values to at least one other software agent.

17. The system as described in claim 16 wherein the runtime engine is a virtual machine in a browser.

18. The system as described in claim 17 wherein the software agent is an applet.

19. A computer program product for use in a computer connected within a distributed computing environment having a management server servicing a set of managed computers, comprising:

instruction means for implementing a resource monitoring task as a function of a set of one or more attributes whose values collectively define a state;

control means responsive to a change of the state for automatically propagating new attribute values to at least one other computer implementing the resource monitoring task.

20. A computer connected within a distributed computing environment having a management server servicing a set of managed computers, comprising:

a processor;

an operating system;

instruction means executed by the operating system for implementing a resource monitoring task as a function of a set of one or more attributes whose values collectively define a state; and control means responsive to a change of the state for automatically propagating new attribute values to at least one other computer within the distributed computing environment implementing the resource monitoring task.

* * * * *